United States Patent
Kim

(10) Patent No.: US 7,265,798 B2
(45) Date of Patent: Sep. 4, 2007

(54) OPTICAL SYSTEM FOR PROJECTION TELEVISION

(75) Inventor: Sang-ik Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 619 days.

(21) Appl. No.: 10/461,406

(22) Filed: Jun. 16, 2003

(65) Prior Publication Data

US 2004/0004676 A1    Jan. 8, 2004

(30) Foreign Application Priority Data

Jul. 4, 2002    (KR) ...................... 10-2002-0038690

(51) Int. Cl.
*H04N 5/64* (2006.01)
(52) U.S. Cl. ..................................... 348/787
(58) Field of Classification Search ........ 348/787–789, 348/744, 770–771, 791; 359/433, 224; 362/238
See application file for complete search history.

(56) References Cited

U.S. PATENT DOCUMENTS

| | | | | |
|---|---|---|---|---|
| 5,633,755 A | * | 5/1997 | Manabe et al. ............. | 359/443 |
| 6,072,443 A | * | 6/2000 | Nasserbakht et al. .......... | 345/7 |
| 6,391,245 B1 | * | 5/2002 | Smith ......................... | 264/401 |
| 6,500,378 B1 | * | 12/2002 | Smith ......................... | 264/401 |
| 6,758,579 B2 | * | 7/2004 | Ishikawa et al. ............ | 362/238 |
| 2002/0008676 A1 | * | 1/2002 | Miyazaki et al. .............. | 345/6 |

* cited by examiner

*Primary Examiner*—Paulos M. Natnael
(74) *Attorney, Agent, or Firm*—Sughrue Mion, PLLC

(57) ABSTRACT

An optical system includes a lens assembly fixed to a base for projecting an image light onto a surface; a DMD assembly movably disposed at one side of the lens assembly for reflecting the light irradiated from a light source onto the lens assembly; supporting members disposed at the one side of the lens assembly for supporting the DMD assembly; and an adjuster for moving the DMD assembly to adjust a tilt. The adjuster includes a guide member having a screw hole and fixed to the base; an adjusting screw driven into the screw hole for moving the DMD assembly along a lengthwise direction of the guide member; and a push rod having an end connected to the DMD assembly and another end connected to the adjusting screw. The DMD assembly is movable by adjusting the adjusting screw so that a tilt angle can be easily and precisely adjusted.

15 Claims, 4 Drawing Sheets

OPTICAL SYSTEM FOR PROJECTION TELEVISION

OPTICAL SYSTEM FOR PROJECTION TELEVISION

This application claims the priority of Korean Patent Application No. 2002-0038690, filed Jul. 4, 2002 in the Korean Intellectual Property Office, which is incorporated herein in its entirety.

BACKGROUND OF THE INVENTION

1. Field of the Invention

The present invention relates to a projection television and, more particularly, to an optical system for a projection television.

2. Background of the Related Art

A conventional projection television is a device for magnifying and projecting image light generated from an image display means onto a projection surface such as a screen. As shown in FIG. 1, the conventional projection television comprises a cabinet 10 with a screen 11 exposed to the outside, a reflection mirror 20 installed inside the cabinet 10, an optical system 30 and a light source 40. The light source 40 generates a light to irradiate on the optical system 30 and the optical system 30 generates an image light to arrive on the reflection mirror 20, whereby the image light is projected to form an image on the screen 11.

Generally, an LCD (Liquid Crystal Display) or a DMD (Digital Micromirror Device) is adapted to an image display means for generating an image light for the optical system 30. Since the LCD has disadvantages of manufacturing difficulty and low brightness, the DMD is widely used recently. The DMD is used for a DLP (Digital Light Processing) system, which is an optical switch display element for changing the angle of a micro-mirror between +10 degrees to −10 degrees to switch between two modes of the reflection angles of lights. FIG. 2 is a perspective view schematically showing an optical system having a DMD for a conventional projection television.

As shown in FIG. 2, the optical system 30 comprises a DMD panel assembly 31 with a plurality of micro-mirrors, and a projection lens assembly 32, and is disposed at a base frame 12. A light irradiated from the light source 40 (see FIG. 1) is reflected by the micro-mirrors of the DMD panel assembly 31 onto the projection lens assembly 32, and the reflected image light is projected to a projection surface such as the screen 11 (see FIG. 1) to be displayed.

With the above construction of the optical system for the conventional projection television, the DMD panel assembly 31 is adjusted by hand or an additional control device disposed at the projection lens assembly 32 is used in order to adjust the tilt angle of the image light or a position at which an image is projected.

When the DMD panel assembly 31 is fixed by using clamps such as screws after the tilt angle of the DMD panel assembly 31 is adjusted by moving the DMD panel assembly 31 by hand, the problem occurs in that a precise adjustment of the tilt angle is difficult.

On the other hand, when the additional control device is disposed at the projection lens assembly 32, the problem occurs in that the structure of the projection lens assembly 32 becomes more complex.

SUMMARY OF THE INVENTION

An aspect of the invention is to solve at least the above problems and disadvantages and to provide at least the advantages described hereinafter.

Accordingly, an aspect of the present invention is to solve the foregoing problems by providing an optical system for a projection television having a simple structure and capable of easily adjusting a tilt angle of an image light and a position at which an image is projected.

An apparatus consistent with the present invention relates to an optical system for a projection television, comprising: a projection lens assembly fixed to a base frame for projecting an image light generated by a light irradiated from a light source on to a projection surface; a DMD panel assembly movably disposed at one side of the projection lens assembly for reflecting the light irradiated from the light source on to the projection lens assembly and forming an image light; at least one supporting member disposed at the one side of the projection lens assembly for supporting the DMD panel assembly; and a tilt adjusting means for moving the DMD panel assembly to adjust a tilt.

According to the invention, the tilt adjusting means preferably includes: a guide member having a screw hole and fixed to the base frame; an adjusting screw driven into the screw hole for moving the DMD panel assembly along a lengthwise direction of the guide member; and a push rod having one end connected to the DMD panel assembly and the other end connected to one end of the adjusting screw.

Preferably, but not necessarily, the supporting members are screwed into screw holes formed into the projection lens assembly through insert holes formed into the DMD panel assembly, and the DMD panel assembly is biased toward the projection lens assembly by springs disposed at the other ends of the supporting members.

Furthermore, it is preferable that the push rod is fixed to the guide member with a first fixing screw, and the base frame is provided with a holding panel and the DMD panel assembly is fixed to the holding panel by using a second fixing screw.

Preferably, but not necessarily, the guide member has a first guide slot for inserting the first fixing screw through and the holding panel has a second guide slot for inserting the second fixing screw through.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, wherein.

DETAILED DESCRIPTION OF ILLUSTRATIVE, NON-LIMITING EMBODIMENTS

The illustrative, non-limiting embodiments of the invention will be hereinafter described in detail with reference to the accompanying drawings.

Figure 3:
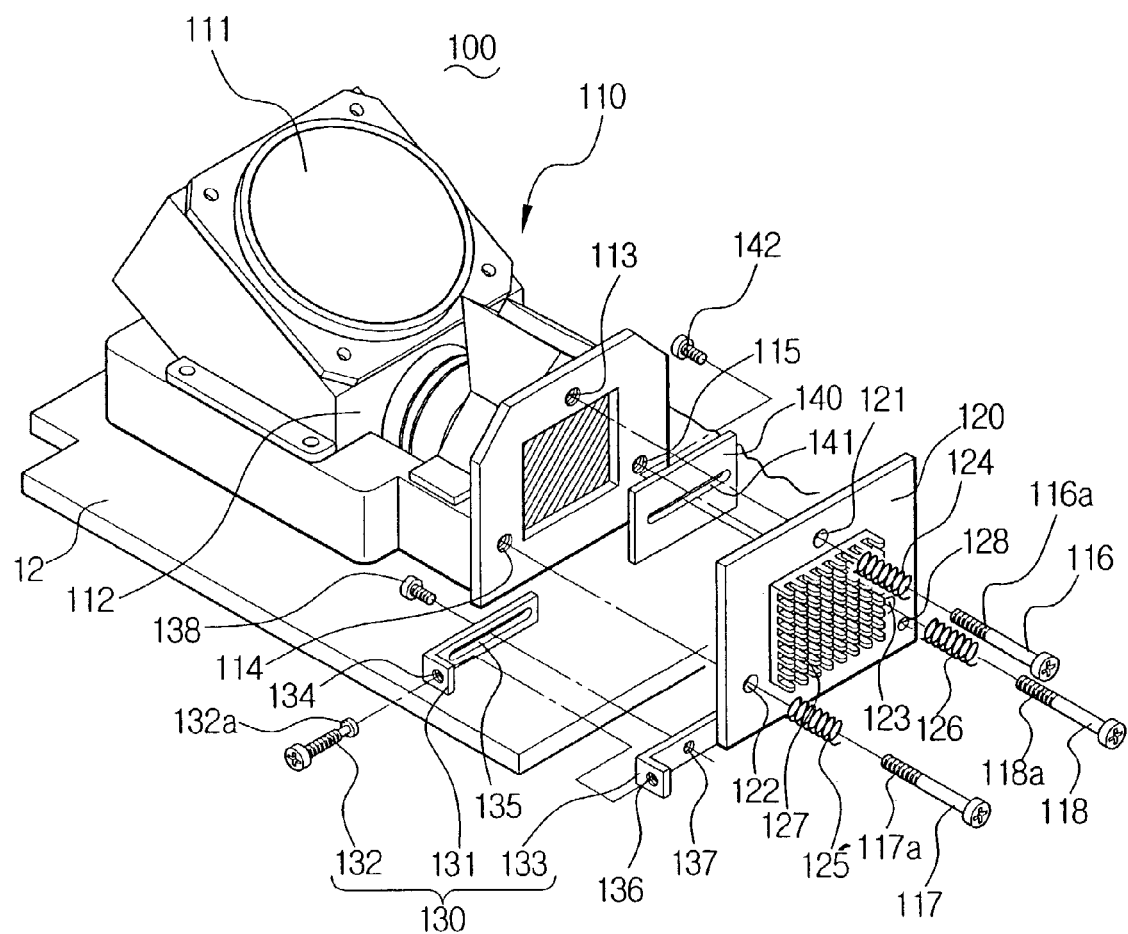
FIG. 3 is a perspective view schematically showing a structure of an optical system for a projection television, according to the invention before assembling.
Figure 4:
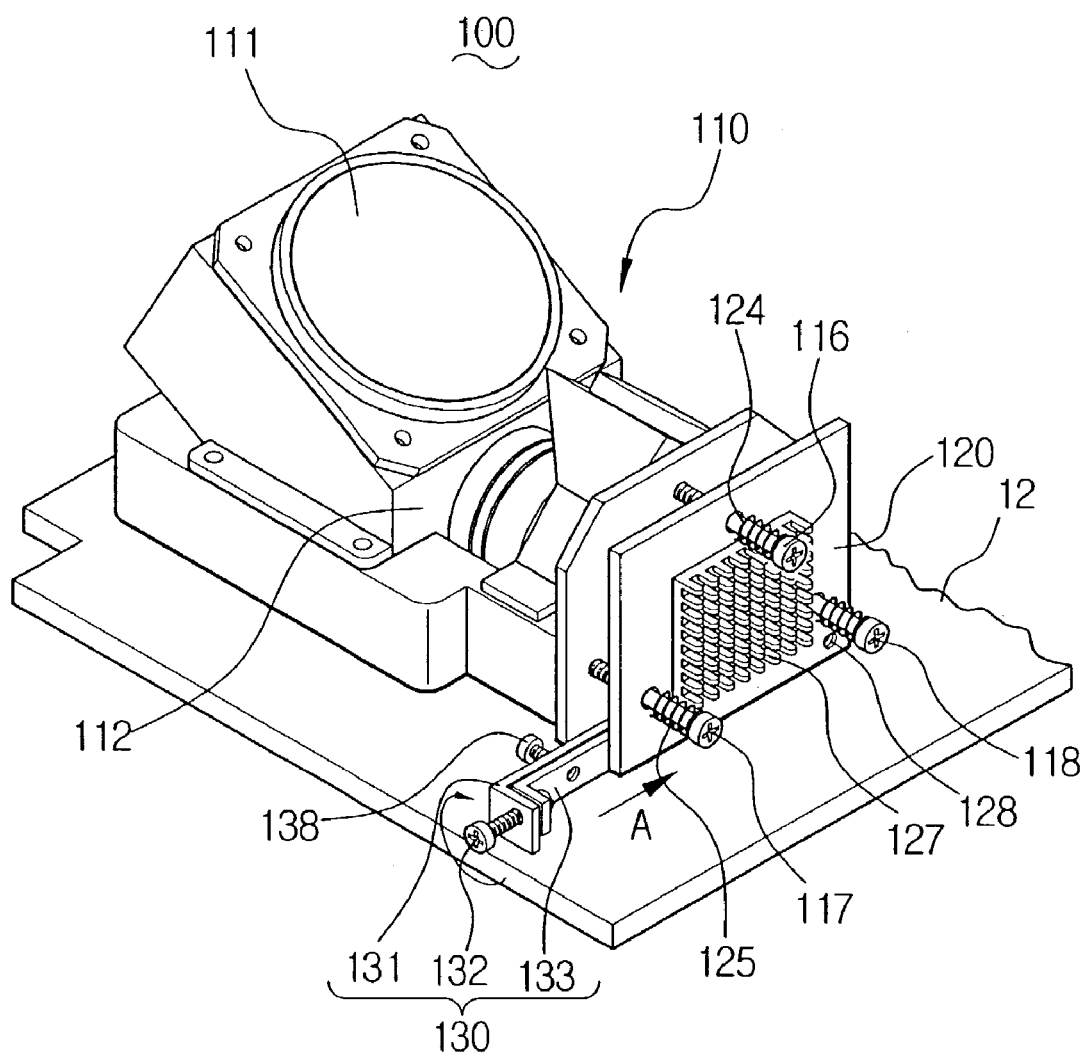
FIG. 4 is a perspective view showing the optical system of FIG. 3 after assembling.

FIG. 3 is a perspective view schematically showing an optical system for a projection television, according to the invention before assembling, and FIG. 4 is a perspective view showing the optical system of FIG. 3 after assembling.

As shown in FIGS. 3 and 4, the optical system 100 of the projection television according to the invention is provided with a projection lens assembly 110, a DMD panel assembly 120, a tilt adjusting means 130 and a holding panel 140.

Figure 1:
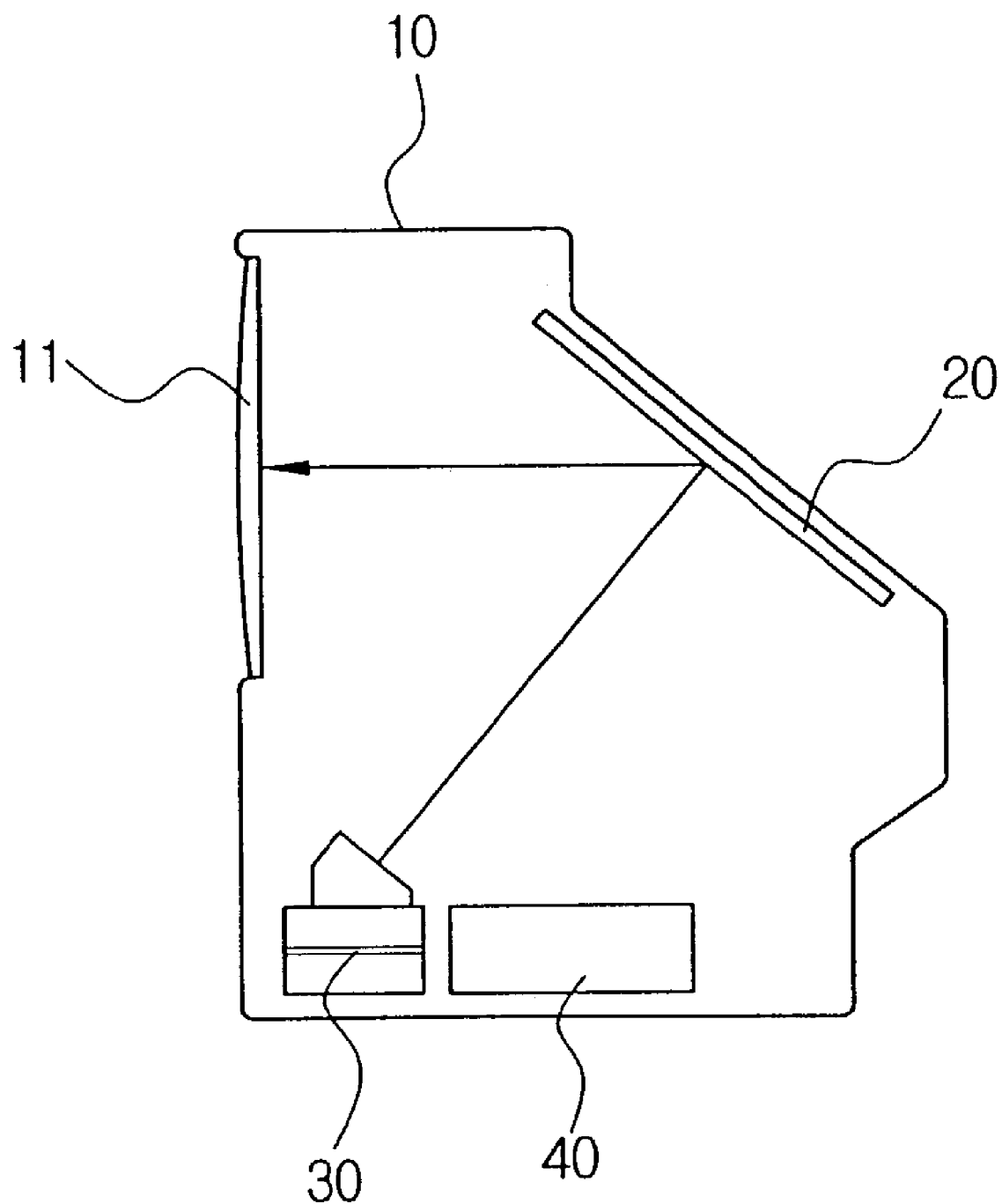
FIG. 1 is a schematic view showing a structure of a conventional projection television.
Figure 2:
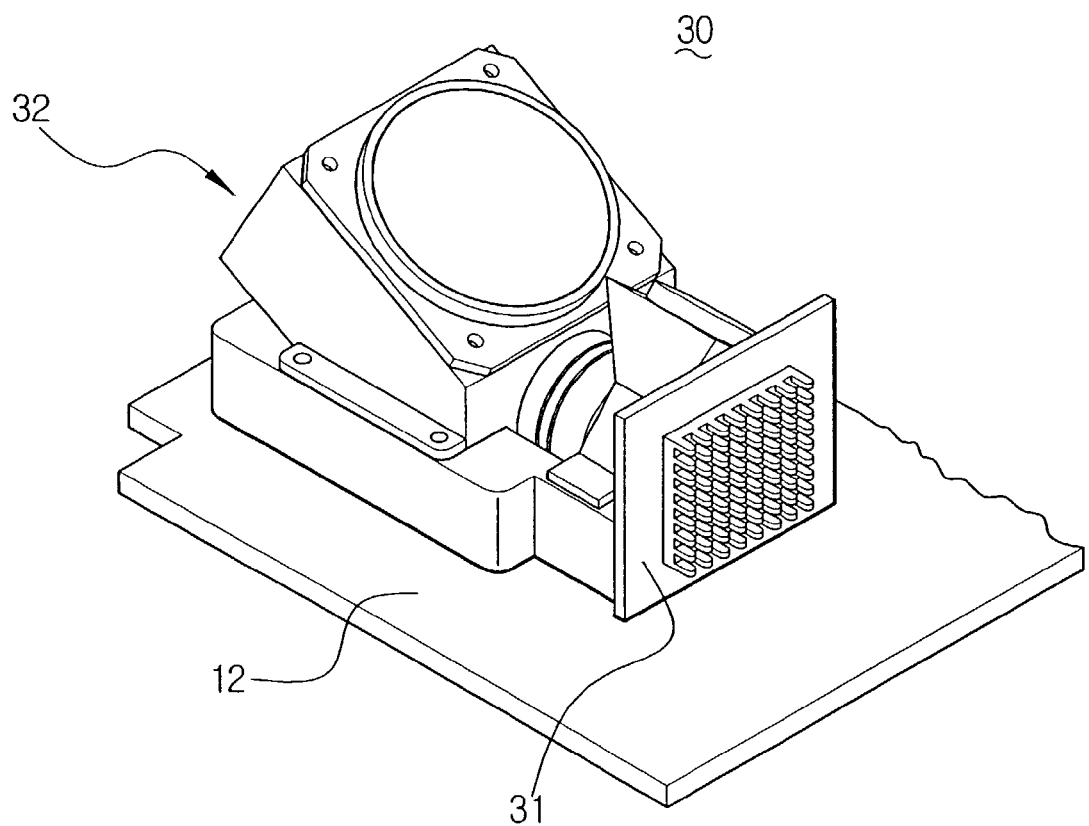
FIG. 2 is a perspective view schematically showing an optical system of FIG. 1.

The projection lens assembly 110 comprises a projection lens 111 and a housing 112 for supporting the projection lens 111, and is fixed on a base frame 12. An image light projected on the projection lens assembly 110 is reflected by mirrors disposed inside of the housing 112 onto the projection lens 111 and is further magnified to be projected onto the screen 11 (see FIG. 1) Screw holes 113, 114 and 115 are formed into the housing 112.

The DMD panel assembly 120 is provided with insert holes 121, 122 and 123 corresponding to the screw holes 113, 114 and 115. Supporting members 116, 117 and 118 having screw portions 116a, 117a and 118a are screwed into the screw holes 113, 114 and 115 through the insert holes 121, 122 and 123, respectively, and thus support the DMD panel assembly 120. Since the supporting members 116, 117 and 118 have diameters smaller than those of the insert holes 121, 122 and 123, there are gaps of predetermined sizes therebetween so that the DMD panel assembly 120 can move within the gaps. The supporting members 116, 117 and 118 are installed with springs 124, 125 and 126, respectively, and thus the DMD panel assembly 120 is biased toward the projection lens assembly 110 by elastic forces of the respective springs 124, 125 and 126 to be prevented from moving. An outer side of the DMD panel 120 is provided with a radiator 127 and a screw hole 128. An inner side of the DMD panel 120 is provided with a plurality of micro-mirrors (not shown).

The tilt adjusting means 130 includes a guide member 131, an adjusting screw 132 and a push rod 133. The guide member 131 includes a screw hole 134 and a guide slot 135, and is fixed on the base frame 12. The adjusting screw 132 is driven into the screw hole 134. The push rod 133 has one end connected to the DMD panel assembly 120 and another end connected to one end of the adjusting screw 132 to interlock with the adjusting screw 132. In detail, a connecting portion 132a at the one end of the adjusting screw 132 is inseparably connected to a connecting hole 136 in the end of the push rod 133 so that the push rod 133 interlocks with the adjusting screw 132 as the adjusting screw 132 moves. The push rod 133 further has a screw hole 137 to drive a fixing screw 138 into the screw hole 137 through the guide slot 135, so that the push rod 133 may be fixed to the guide member 131.

The holding panel 140 is fixably disposed at the base frame 12. The holding panel 140 has a guide slot 141 corresponding to the screw hole 128. The screw hole 128 is placed to correspond to the guide slot 141, and then a fixing screw 142 is driven through the guide slot 141 into the screw hole 128 so that the DMD panel assembly 120 is fixed to the holding panel 140.

Hereinafter, the operation of the optical system 100 for a projection television, according to the invention, will be described with reference to FIG. 4.

First, the fixing screws 138 and 142 and the supporting members 116, 117 and 118 are released, then the elastic forces of the springs 124, 125 and 126 applied to the DMD panel assembly 120 are removed to make the push rod 133 and the DMD panel 120 movable. In turn, the adjusting screw 132 is rotated in the clockwise direction such that the adjusting screw 132 is moving while being supported by the guide member 131. Consequently, the push rod 133 connected to the guide member 131 linearly moves in an arrowed direction A and the DMD panel assembly 120 moves within the respective gaps between the supporting members 116, 117 and 118 and insert holes 121, 122 and 123. After a tilt angle is adjusted by rotating the adjusting screw 132 clockwise or counterclockwise, the supporting members 116, 117 and 118 are tightened so that the springs 124, 125 and 126 bias the DMD panel assembly 120 toward the projection lens assembly 110, and at the same time the push rod 133 and the DMD panel assembly 120 are fixed to the guide member 131 and the holding panel 140, respectively, so that the DMD panel assembly 120 can maintain the adjusted tilt angle.

Although the above exemplary description is limited to a projection television for illustrative purposes, the present system may be adapted to various projection apparatuses having optical systems.

According to the invention, as described above, a user can move the DMD panel assembly 120 linearly by driving the adjusting screw 132 of the tilt adjusting means 130. Therefore, the invention enables the user to easily and precisely adjust a tilt angle of an image light and a position on which an image is projected by driving the adjusting screw 132.

Furthermore, since the tilt adjusting means 130 according to the invention has a simple structure, the manufacturing process of the optical system 100 can be shortened and the manufacturing costs can also be reduced as a result.

While the invention has been shown and described with reference to certain illustrative, non-limiting embodiments thereof, it will be understood by those skilled in the art that various changes in form and details may be made therein without departing from the spirit and scope of the invention, as defined by the appended claims.

The foregoing embodiments and advantages are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An optical system, comprising:
    a projection lens assembly fixed to a base frame for projecting an image light onto a projection surface, the image light being generated by a light irradiated from a light source;
    a DMD panel assembly movably disposed at one side of the projection lens assembly for reflecting the light irradiated from the light source onto the projection lens assembly and forming the image light;
    a supporting member disposed at the one side of the projection lens assembly for supporting the DMD panel assembly; and
    a tilt adjusting means for moving the DMD panel assembly as a single unit to adjust a tilt.

2. The optical system according to claim 1, wherein the tilt adjusting means includes:
- a guide member having a screw hole and fixed to the base frame;
- an adjusting screw driven into the screw hole for moving the DMD panel assembly along a lengthwise direction of the guide member; and
- a push rod having one end connected to the DMD panel assembly and another end connected to one end of the adjusting screw.

3. The optical system according to claim 1, wherein the supporting member is screwed into a screw hole formed into the projection lens assembly through an insert hole formed into the DMD panel assembly, and the DMD panel assembly is biased toward the projection lens assembly by a spring disposed at an other end of the supporting member.

4. The optical system according to claim 1, further comprising at least one additional supporting member, wherein each supporting member is screwed into a screw hole formed into the projection lens assembly through an insert hole formed into the DMD panel assembly, and the DMD panel assembly is biased toward the projection lens assembly by a spring disposed at an other end of each supporting member.

5. The optical system according to claim 2, wherein the tilt adjusting means further includes a first fixing screw for fixing the push rod to the guide member.

6. The optical system according to claim 5, wherein the base frame is provided with a holding panel and the DMD panel is fixed to the holding panel by using a second fixing screw.

7. The optical system according to claim 5, wherein the guide member has a first guide slot for inserting the first fixing screw thereto.

8. The optical system according to claim 5, wherein the holding panel has a second guide slot for inserting the second fixing screw thereto.

9. The optical system according to claim 3, wherein a diameter of the supporting member is smaller than a diameter of the insert hole.

10. The optical system according to claim 1, wherein the optical system is disposed in a projection apparatus.

11. The optical system according to claim 10, wherein the projection apparatus is a projection television.

12. An optical system, comprising:
- a projection lens assembly fixed to a base frame for projecting an image light onto a projection surface, the image light being generated by a light irradiated from a light source;
- a DMD panel assembly movably disposed at one side of the projection lens assembly for reflecting the light irradiated from the light source onto the projection lens assembly and forming the image light;
- at least one supporting member disposed at the one side of the projection lens assembly for supporting the DMD panel assembly; and
- an adjuster, which moves the DMD panel assembly to adjust a tilt, said adjuster including:
  - a guide member having a screw hole and fixed to the base frame; and
  - an adjusting screw driven into the screw hole for moving the DMD panel assembly along a lengthwise direction of the guide member.

13. The optical system according to claim 12, wherein the adjuster further includes a push rod having one end connected to the DMD panel assembly and another end connected to one end of the adjusting screw.

14. The optical system according to claim 13, wherein the adjuster further includes a first fixing screw for fixing the push rod to the guide member.

15. The optical system according to claim 13, wherein the guide member has a first guide slot for inserting the first fixing screw thereto.

* * * * *